(12) United States Patent
Choi et al.

(10) Patent No.: US 8,064,027 B2
(45) Date of Patent: Nov. 22, 2011

(54) PREVENTING WIRING CORROSION IN LCDS

(75) Inventors: Jin Young Choi, Seoul (KR); Dong Hwan Kim, Suwon (KR); Jin Jeon, Anyang (KR); Yong Gi Park, Siheung (KR)

(73) Assignee: Samsung Electronics Co., Ltd. (KR)

( * ) Notice: Subject to any disclaimer, the term of this patent is extended or adjusted under 35 U.S.C. 154(b) by 751 days.

(21) Appl. No.: 12/001,609

(22) Filed: Dec. 11, 2007

(65) Prior Publication Data

US 2008/0137021 A1 Jun. 12, 2008

(30) Foreign Application Priority Data

Dec. 12, 2006 (KR) .................. 10-2006-0126427

(51) Int. Cl.
*G02F 1/1345* (2006.01)
*G02F 1/1339* (2006.01)
(52) U.S. Cl. .................. 349/149; 349/150; 349/153
(58) Field of Classification Search .................. 349/40, 349/149–153, 190
See application file for complete search history.

(56) References Cited

U.S. PATENT DOCUMENTS

| 6,049,365 | A | 4/2000 | Nakashima |
| 6,697,139 | B1 | 2/2004 | Kawamura et al. |
| 6,833,900 | B2 | 12/2004 | Aruga |
| 7,692,443 | B2 * | 4/2010 | Jeon .............. 324/770 |
| 2007/0002204 | A1 * | 1/2007 | Kim et al. ............ 349/54 |

FOREIGN PATENT DOCUMENTS

| JP | 8-6059 | 1/1996 |
| JP | 2003-202584 | 7/2003 |
| JP | 2004-94020 | 3/2004 |
| KR | 10-2005-0104869 | 11/2005 |
| KR | 10-2006-0000983 | 1/2006 |
| KR | 10-2006-0001652 | 1/2006 |
| KR | 10-2006-0011587 | 2/2006 |
| KR | 10-2006-0072790 | 6/2006 |

OTHER PUBLICATIONS

English Language Abstract, Publication No. JP8006059, Jan. 12, 1996, 1 p.
English Language Abstract, Publication No. JP2003202584, Jul. 18, 2003, 1 p.
English Language Abstract, Publication No. JP2004094020, Mar. 25, 2004, 1 p.

(Continued)

*Primary Examiner* — Dung T. Nguyen
(74) *Attorney, Agent, or Firm* — Innovation Counsel LLP

(57) ABSTRACT

A display device includes a display panel having a display region and a peripheral region. Signal lines disposed in the peripheral region provide an image display signal to the display region. A test pad portion is disposed in the peripheral region and connected to at least some of the signal lines. The test pad portion includes a test pad, an extension line extending from the test pad, and a bridge wire connecting the extension line to an associated signal line. The bridge wire is formed of a corrosion resistant material. The signal line is protected from corrosion by connecting the signal line to the test pad portion via the bridge wire, which prevents corrosion of the test pad from spreading to the signal line. The bridge wire can be protected from corrosion by disposing it under a sealing member of the panel.

15 Claims, 7 Drawing Sheets

OTHER PUBLICATIONS

Korean Patent Abstracts, Publication No. 1020050104869, Nov. 3, 2005, 2 pp.
Korean Patent Abstracts, Publication No. 1020060000983, Jan. 6, 2006, 1 p.
Korean Patent Abstracts, Publication No. 1020060001652, Jan. 6, 2006, 1 p.
Korean Patent Abstracts, Publication No. 1020060011587, Feb. 3, 2006, 1 p.
Korean Patent Abstracts, Publication No. 1020060072790, Jun. 28, 2006, 1 p.

* cited by examiner

PREVENTING WIRING CORROSION IN LCDS

RELATED APPLICATIONS

This application claims priority of Korean Patent Application No. 2006-0126427, filed Dec. 12, 2006, the entire disclosure of which is incorporated herein by reference.

BACKGROUND

This disclosure relates to display devices, such as liquid crystal display (LCD) devices, and more particularly, to a wiring connection technique for display devices that prevents wires in the display regions of display panels from corroding due to corroded test pads disposed outside the display regions.

LCDs constitute one of the more widely used types of flat panel display devices, and typically include an LCD panel for displaying images in response to an external control signal and means for driving the panel. The LCD panel includes upper and lower substrates having a display region and a peripheral region, with a layer of a liquid crystal material sealed between the two substrates. In the manufacture of such LCD panels, thin film transistors, pixel electrodes and the like are formed on the lower substrate, and color filters, a common electrode and the like are formed on the upper substrate. The upper and lower substrates are bonded together, a common seal is formed at their adjacent edges, and the liquid crystal material is then injected between the two substrates to complete the panel.

Completed LCD panels are subject to a visual test after the panel manufacturing process in order to detect signal line defects, such as a short or an open circuit in the signal lines, thin film transistor defects, and the like. The visual test is performed using a plurality of test pads that are located in a peripheral region of the lower substrate and connected to a plurality of signal lines located in the display region of the panel.

After the visual test, the test pads remain exposed to air in the peripheral region of the lower substrate. As a result, the test pads easily corrode. Corrosion generated in the test pads spreads to the signal lines in the display region connected thereto, resulting in corrosion of the signal lines. The corrosion of the signal lines in the display region of the device causes the device to malfunction.

BRIEF SUMMARY

In accordance with the exemplary embodiments described herein, liquid crystal display devices are provided in which corrosion generated in a test pad portion of the display is pre-vented from spreading to signal lines in a display region thereof by forming the test pad portion of a conductive layer that does not spread corrosion or by electrically connecting the test pad portions to the signal lines via separate bridge wires that do not spread corrosion.

In accordance with one exemplary embodiment, a display device comprises an LCD display panel including a display region and a peripheral region. A plurality of signal lines is disposed in at least in the peripheral region of the panel and a plurality of test pad portions is disposed in the peripheral region of the panel and connected to at least some of the plurality of signal lines. Each of the test pad portions comprises a test pad, an extension line extending from the test pad, and a bridge wire formed of a corrosion resistance material connecting the extension line to an associated one of the signal lines.

The bridge wire may be formed of the same material as pixel electrodes of the display region of the panel. The bridge wire is preferably formed of at least one of indium tin oxide (ITO) and indium zinc oxide (IZO). The bridge wire preferably comprises first and second bridge contact pads respectively connected to the extension and signal lines; and a connection wire for connecting the first and second bridge contact pads to each other.

Preferably, the peripheral region of the display panel comprises a sealing region and an open region, with the bridge wire being disposed in the sealing region and the test pad being disposed in the open region. A sealing member may be provided in the sealing region and disposed around the display region of the display panel, and the bridge wire is preferably disposed under the sealing member.

The LCD panel may further comprise a lower substrate that includes respective pluralities of gate lines, data lines, thin film transistors and pixel electrodes, an upper substrate including a common electrode and a plurality of color filters, and a liquid crystal layer provided between the upper and lower substrates.

The signal and extension lines may be formed of the same material as and manufactured simultaneously with respective ones of the gate lines or the data lines.

The peripheral region of the LCD panel may comprise a sealing region and an open region, and the panel may include at least one gate driving unit disposed on the lower substrate in the sealing region and connected to the plurality of gate lines, and a control unit disposed on the lower substrate in the open region and connected to the data lines and the gate driving unit via the plurality of the signal lines.

Additionally, there may be further provided at least one gate driving unit disposed on the lower substrate in the peripheral region and connected to the plurality of gate lines, and a printed circuit board connected to the display panel via a flexible printed circuit board, wherein a data driving unit and a signal control unit are preferably mounted on the printed circuit board, the data driving unit being electrically connected to the data lines via the signal lines, the signal control unit being connected to the data driving unit and electrically connected to the gate driving unit via the signal lines.

In another exemplary embodiment, a display device comprises an LCD panel that includes a display region and a peripheral region, a plurality of signal lines disposed in the peripheral region of the panel, and a plurality of test pad portions disposed in the peripheral region of the panel and connected to at least some of the plurality of signal lines, wherein the test pad portions are formed of a corrosion resistance material.

The test pad portions are preferably formed of the same material as the pixel electrodes in the display region of the panel. The test pad portions may be formed of at least one of ITO and IZO.

Preferably, the test pad portions comprise a test pad, an extension line extending from the test pad, and a contact pad connecting the extension line to the signal line.

The peripheral region of the display panel preferably comprises a sealing region and an open region, with the contact pad disposed in the sealing region, and the test pad disposed in the open region. Further, a sealing member may be provided in the sealing region and disposed around the display region of the display panel, with the contact pad preferably disposed under the sealing member.

A better understanding of the above and many other features and advantages of the LCD panels and corrosion-preventing wiring techniques therefor of the present invention may be obtained from a consideration of the detailed description below of some exemplary embodiments thereof, particularly if such consideration is made in conjunction with the appended drawings, wherein like reference numerals are used to identify like elements illustrated in one or more of the figures thereof.

DETAILED DESCRIPTION

Figure 1:
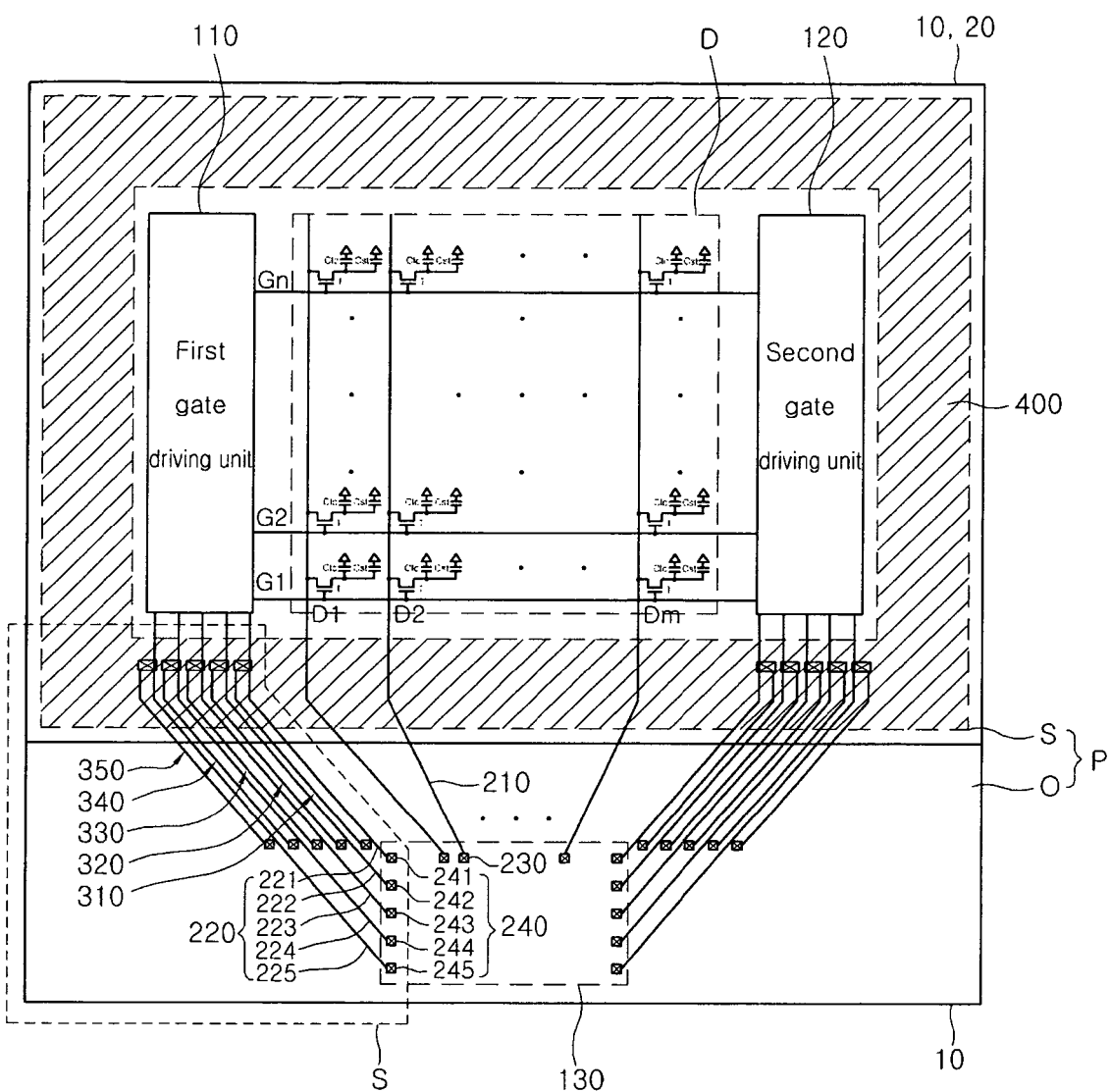
FIG. 1 is a conceptual plan view of a first exemplary embodiment of a display device in accordance with the present invention.

Preferred exemplary embodiments of the present invention are described in detail below with reference to the accompanying drawings. However, it should be understood that the present invention is not limited to the particular exemplary embodiments disclosed herein but may be implemented in different forms. The particular exemplary embodiments described herein are thus provided only for illustrative purposes and for full understanding of the scope of the present invention by those skilled in the art.

In the drawings, the thicknesses of layers and regions are exaggerated for clarity, and like reference numerals are used to designate like elements throughout the specification and drawings. Further, when a first element, such as a layer, region, substrate or plate, is said to be "disposed on or above" a second element, this should be understood to include not only the case in which the first element is placed directly on or immediately above the second element, but also the case in which a third element is interposed between the first element and the second element.

Figure 2:
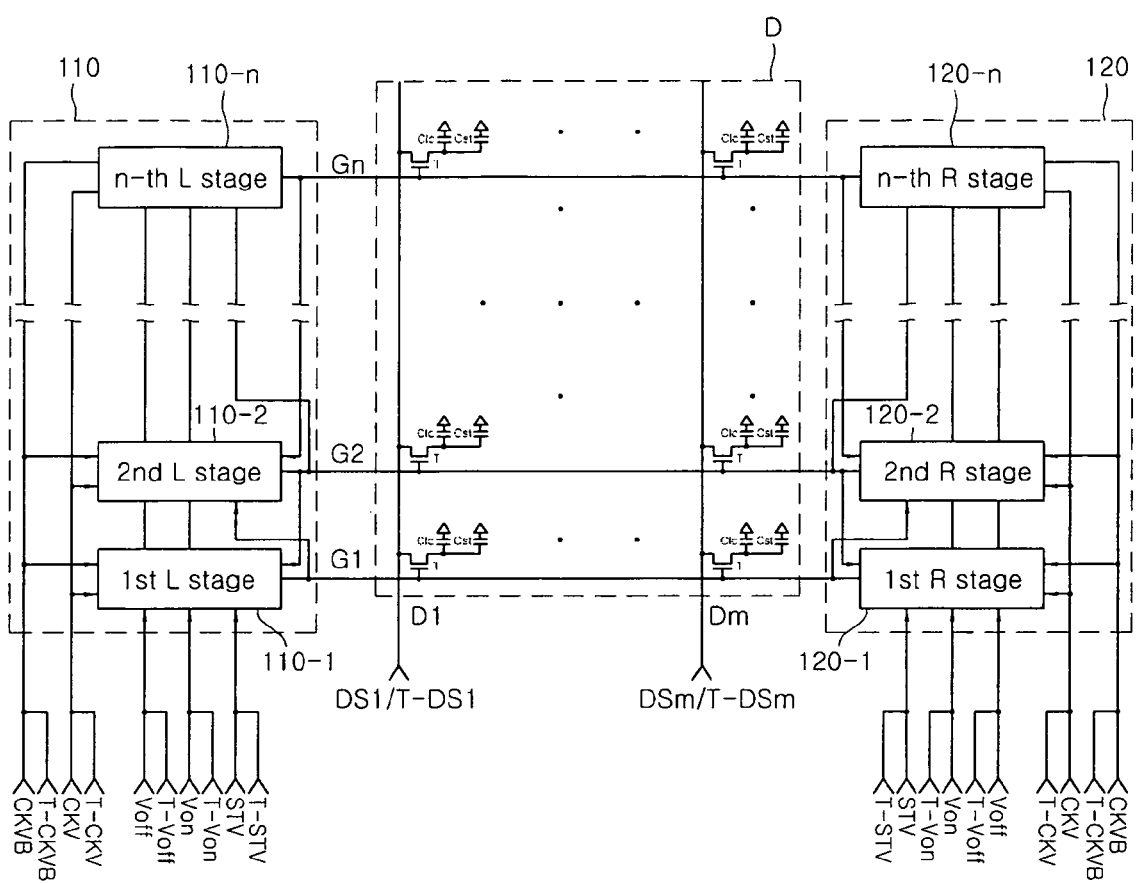
FIG. 2 is a conceptual diagram illustrating the operation of the first exemplary display device of FIG. 1.
Figure 3:
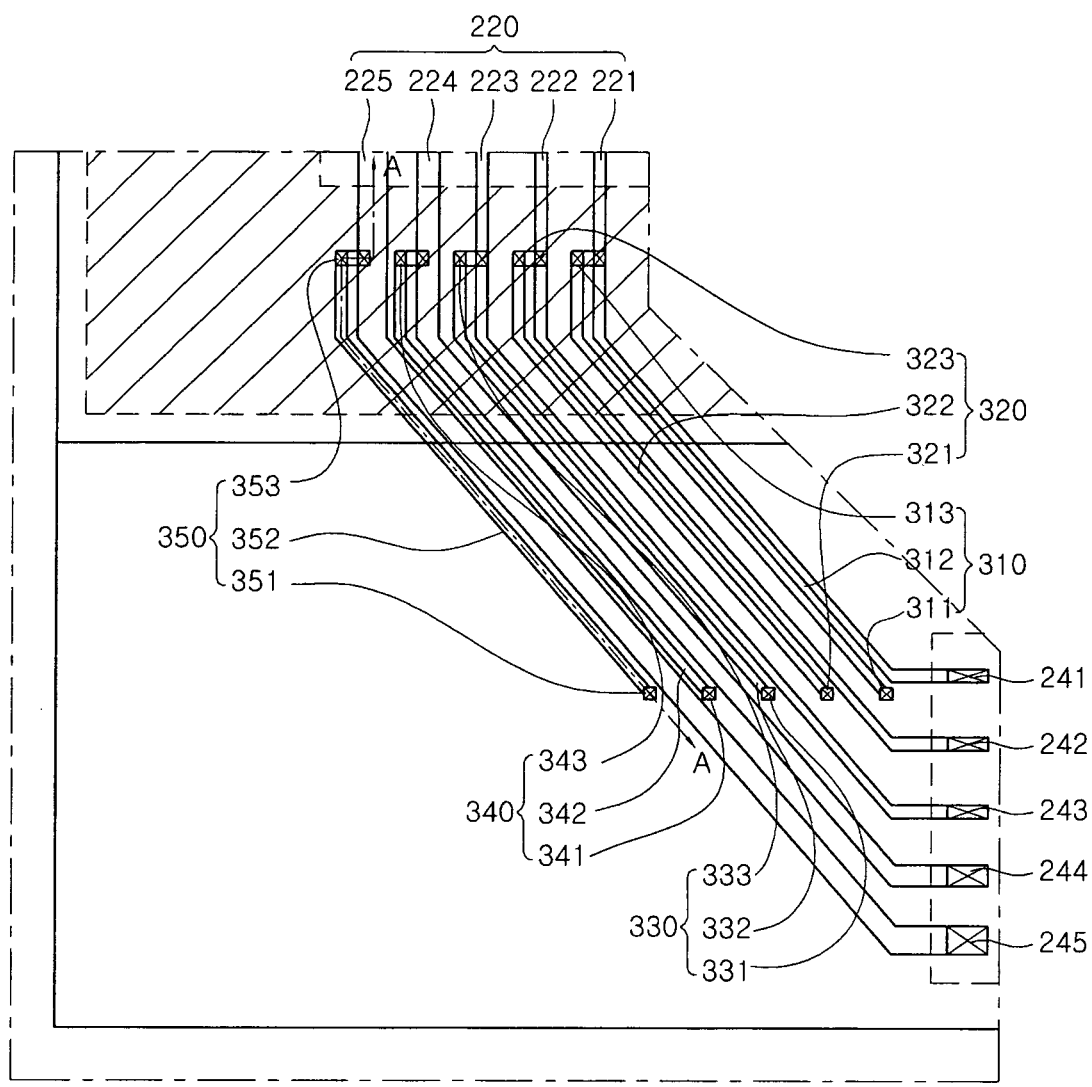
FIG. 3 is an enlarged partial plan view of a region S located on the lower left side of the exemplary display device of FIG. 1.
Figure 4:
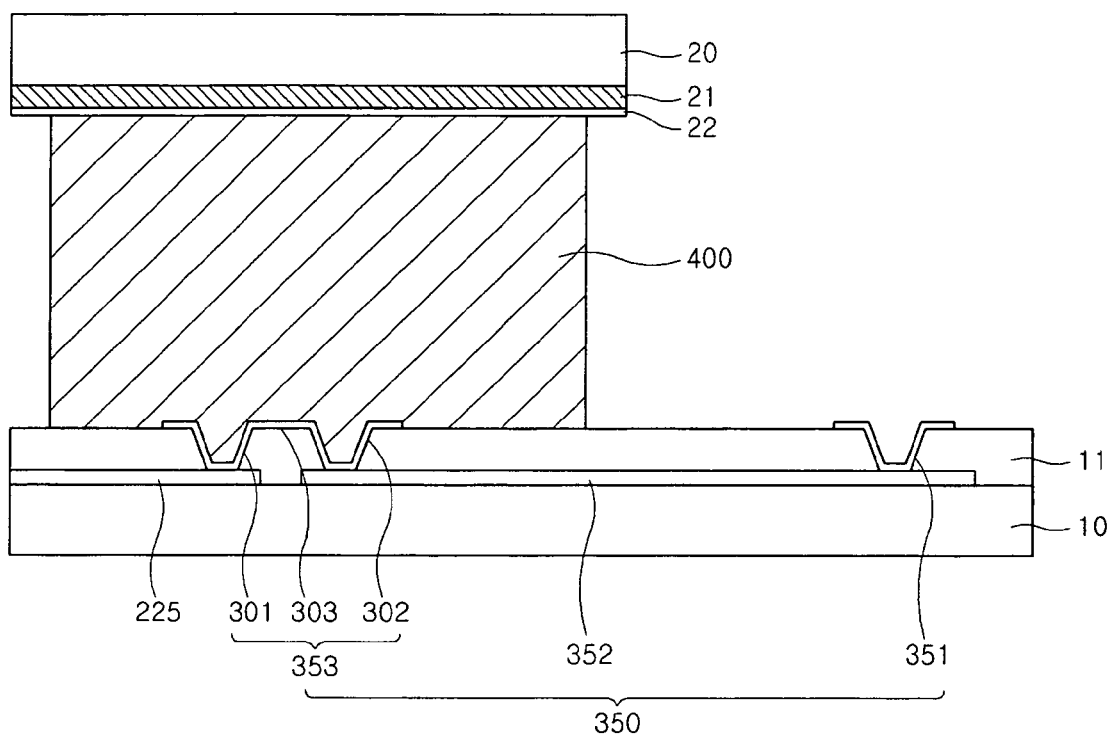
FIG. 4 is a cross-sectional view of the region S of FIG. 3, as seen along the lines of the section A-A taken therein.
Figure 5:
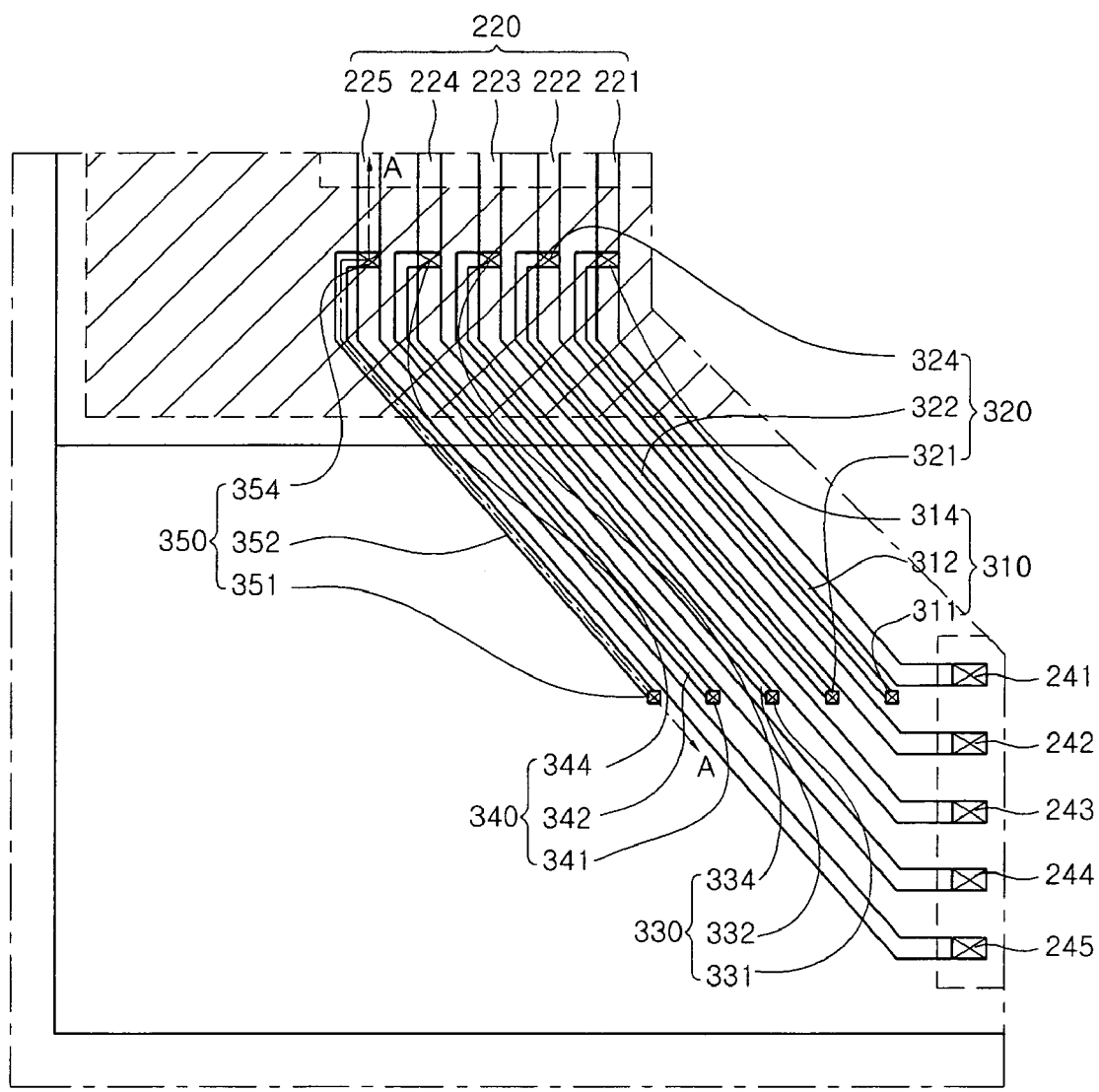
FIG. 5 is an enlarged partial plan view of a modified embodiment of the region S of the exemplary embodiment of FIG. 1.
Figure 6:
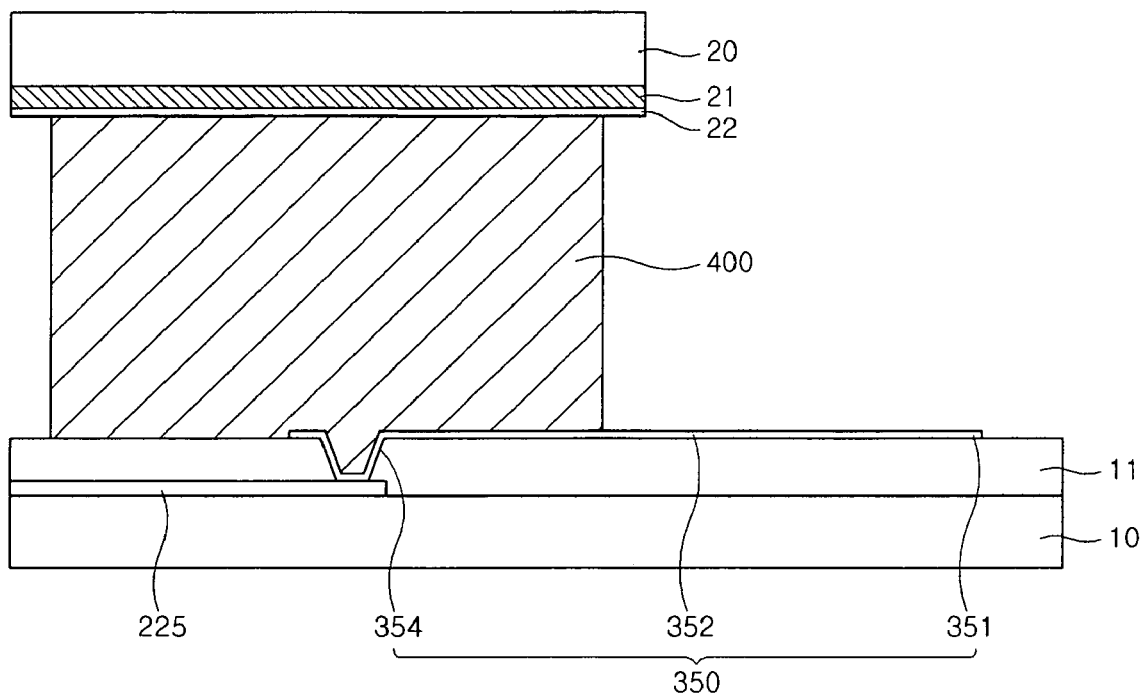
FIG. 6 is a cross-sectional view of the modified region S of FIG. 5, as seen along the lines of the section A-A taken therein; and, FIG. 7 is a conceptual plan view of a second exemplary embodiment of a display device in accordance with the present invention.

FIG. 1 is a conceptual plan view of a first exemplary embodiment of a display device in accordance with the present invention. FIG. 2 is a conceptual diagram illustrating the operation of the first exemplary display device of FIG. 1. FIG. 3 is an enlarged partial plan view of a region S on the lower left side of the exemplary display device of FIG. 1. FIG. 4 is a cross-sectional view of the region S of FIG. 3, as seen along the lines of the section A-A taken therein. FIG. 5 is an enlarged partial plan view of a modified embodiment of the region S of the exemplary embodiment of FIG. 1, and FIG. 6 is a cross-sectional view of the modified region S of FIG. 5, as seen along the lines of the section A-A taken therein.

Referring to FIGS. 1 to 6, the first exemplary display device includes a lower substrate 10 and an upper substrate 20, each of which has a display region D and a peripheral region P. The display regions D include gate lines G1 to Gn, data lines D1 to Dm, thin film transistors T, storage capacitors Cst, and pixel capacitors Clc. That is, the display region D of the lower substrate 10 includes the gate lines G1 to Gn, the data lines D1 to Dm, the thin film transistors T, the storage capacitors Cst, and pixel electrodes (not illustrated) for the pixel capacitors Clc. The display region D of the upper substrate 20 includes color filters (not illustrated) and a common electrode 22 (FIG. 4) for the pixel capacitors Clc. A liquid crystal layer (not illustrated) is provided between the display regions D of the lower and upper substrates 10 and 20.

The peripheral region P includes a sealing region S and an open region O. The peripheral region P also includes first and second gate driving units 110 and 120, signal line portions 210 and 220, including extended data lines D1 to Dm, signal line pad portions 230 and 240 respectively provided at ends of signal line portions 210 and 220, and a control unit 130 connected to the signal line pad portions 230 and 240. The peripheral region P further includes a plurality of test pad portions 310, 320, 330, 340 and 350 connected to at least some of signal line portions 210 and 220.

As may be seen from FIGS. 1 and 2, the signal line portions 220, signal line pad portions 230 and 240 and associated test pad portions 310-350 are disposed generally symmetrically about a vertical line passing through about the middle of the control unit 130, and accordingly, although the following description of these latter elements is made with respect to the lower left side of the display, the description is likewise applicable to the corresponding elements located on the lower right side thereof, as well.

The first and second gate driving units 110 and 120 are provided in the sealing region S of the lower substrate 10, and a black matrix 21 (FIG. 4) is provided in the sealing region S of the upper substrate 20. A sealing member 400 for sealing a gap between the two substrates is provided at edges of the sealing regions S of the lower and upper substrates 10 and 20. In the particular exemplary embodiment illustrated, the signal line portions 210 and 220 extend across both the sealing and open regions S and O of the lower substrate 10. The signal line portions 210 and 220 include a first signal line portion 210 and a second signal line portion 220. The second signal line portion 220 includes a plurality of driving lines 221, 222, 223, 224 and 225 for supplying operation signals from the control unit 130 to respective ones of the first and second gate driving units 110 and 120. The signal line pad portions 230 and 240, the control unit 130 connected to the signal line pad portions 230 and 240, and the test pad portions 310, 320, 330, 340 and 350 connected to portions of the signal line portions 210 and 220 are disposed in the open region O of the lower substrate 10. As may be seen in FIG. 1, the upper substrate 20 includes no open regions O.

The operation of the exemplary display device of FIG. 1 is as follows. In normal operation, the first and second gate driving units 110 and 120 sequentially apply a gate turn-on voltage Von to the plurality of gate lines G1 to Gn in response to an operation signal supplied via the second signal line portion 220 connected to the control unit 130. Responsively, the plurality of thin film transistors T connected to respective ones of the gate lines G1 to Gn are successively turned on. Accordingly, all the thin film transistors T in the display region D of the display device are sequentially turned on during a single image "frame" of the display. Additionally, the control unit 130 generates a plurality of data signals DS1 to DSm in accordance to an external image signal and provides them to the plurality of data lines D1 to Dm. The data signals DS1 to DSm provided to the data lines D1 to Dm are supplied to the pixel capacitors Clc by the turned-on thin film transistors T to impose an electric field across the pixel capacitors Clc. In response to the application of the fields, the alignment of the molecules of the layer of liquid crystal material in each of the pixel capacitors Clc is respectively changed such that the amount of light transmitted through the liquid crystal in each of the pixels is independently adjusted so as to display a desired image.

In greater detail, the foregoing operation is as follows. Referring to FIG. 2, the first and second gate driving units 110 and 120 include a plurality of stages 110-1 to 110-n and 120-1 to 120-n, respectively. The stages 110-1 to 110-n and 120-1 to 120-n sequentially provide a gate turn-on signal Von and a gate turn-off signal Voff to respective ones of the gate lines G1 to Gn respectively connected to the stages 110-1 to 110-n and 120-1 to 120-n in response to a start signal and first and second clock signals CKV and CKVB. The first stages 110-1 and 120-1 of the first and second gate driving units 110 and 120 apply the gate turn-on signal Von to the first gate line G1 in response to a vertical synchronization start signal STV and the first and second clock signals CKV and CKVB. Accordingly, the plurality of thin film transistors T1 connected to the first gate line G1 are turned on, and the data signals DS1 to DSm applied to respective ones of the data lines D1 to Dm are provided to the pixel capacitors Clc by the turned-on thin film transistors T.

In this particular exemplary embodiment, the gate turn-on signal Von from the first stages 110-1 and 120-1 is used as a start signal for driving the second stages 110-2 and 120-2. Accordingly, the second stages 110-2 and 120-2 apply the gate turn-on signal Von to the second gate line G2 in response to the gate turn-on signal Von from the first stages 110-1 and 120-1 and the first and second clock signals CKV and CKVB. Responsively, the thin film transistors T1 connected to the second gate line G2 are turned on, and the data signals DS1 to DSm are respectively provided to the respective pixel capacitors Clc associated therewith. Additionally, the gate turn-on signal Von from the second stages 110-2 and 120-2 is used as a stop signal for stopping the operation of the first stages 110-1 and 120-1. Accordingly, the second stages 110-2 and 120-2 output the gate turn-on signal Von, and at the same time, the first stages 110-1 and 120-1 stop their operation and supply the gate turn-off voltage Voff to the first gate line G1. An inverted first clock signal CKV is used as the second clock signal CKVB.

As described above, the gate turn-on voltage Von and the gate turn-off voltage Voff are sequentially provided to respective ones of the plurality of gate lines G1 to Gn by sequentially driving the plurality of stages using the output of the previous stage as the start signal and the output of the next stage as the stop signal to the immediately preceding stage. At the end of the process, the n-th stages 110-n and 120-n may stop their operation in response to a stop signal generated by a separate "dummy stage" (not illustrated) or by the control unit 130. It will be apparent that the present invention is not limited to the foregoing operation, but the first gate driving unit 110 and the second gate driving unit 120 may operate sequentially in alternate fashion, such that the first gate driving unit 110 sequentially applies the gate turn-on signal Von to the odd-numbered gate lines and the second gate driving unit 120 applies the gate turn-on signal Von sequentially to the even-numbered gate lines.

In a test operation, the first and second gate driving units 110 and 120 sequentially apply a test gate turn-on voltage T-Von to the plurality of gate lines G1 to Gn in response to a test operation signal supplied via the test pad portions 310, 320, 330, 340 and 350, and not the signal normally supplied from the control unit 130. In this case, the plurality of data lines D1 to Dm extending to the peripheral region P may be connected to at least one data test pad (not illustrated).

The plurality of stages 110-1 to 110-n and 120-1 to 120-n in the first and second gate driving units 110 and 120 sequentially operate in response to test signals, i.e., a test start signal T-STV, first and second test clock signals T-CKV and T-CKVB, a test gate turn-on signal T-Von, and a test gate turn-off signal T-Voff supplied via the test pad portions 310, 320, 330 and 340. Accordingly, the plurality of stages 110-1 to 110-n and 120-1 to 120-n can sequentially provide the test gate turn-on signal T-Von to the plurality of gate lines G1 to Gn. In this case, test data signals T-DS1 to T-DSm supplied via the data test pads are supplied to the plurality of data lines D1 to Dm. Responsively, a test image is displayed on the display region D. The test operation enables an image display defect of the display region D to be visually detected. The test operation is preferably performed after the lower substrate 10 and the upper substrate 20 are sealingly bonded to each other.

The second signal line portions 220 include the plurality of driving lines 221-225 for transmitting an operation signal or a test operation signal capable of driving the first and second gate driving units 110 and 120. That is, the second signal line portions 220 include the first driving line 221 for transmitting the vertical synchronization start signal STV or the test vertical synchronization start signal T-STV, the second driving line 222 for transmitting the first clock signal CKV or the first test clock signal T-CKV, the third driving line 223 for transmitting the second clock signal CKVB or the second test clock signal T-CKVB, the fourth driving line 224 for transmitting the gate turn-off signal Voff or the test gate turn-off signal T-Voff, and the fifth driving line 225 for transmitting the gate turn-on signal Von or the test gate turn-on signal T-Von, as illustrated in FIGS. 1-3.

As illustrated in FIGS. 1 and 3, first to fifth driving pads 241, 242, 243, 244, and 245 are provided at ends of the first to fifth driving lines 221, 222, 223, 224 and 225, respectively. The first driving pad 241 is provided at the end of the first driving line 221 to receive the vertical synchronization start signal STV, the second driving pad 242 is provided at the end of the second driving line 222 to receive the first clock signal CKV, the third driving pad 243 is provided at the end of the third driving line 223 to receive the second clock signal CKVB, the fourth driving pad 244 is provided at the end of the fourth driving line 224 to receive the gate turn-off signal Voff, and the fifth driving pad 245 is provided at the end of the fifth driving line 225 to receive the gate turn-on signal Von. As illustrated in FIG. 3, the first to fifth driving lines 221, 222, 223, 224 and 225 have different line widths, depending on the voltage level of the signal applied thereto.

In the particular exemplary embodiment illustrated, respective pluralities of test pad portions 310, 320, 330, 340 and 350 are provided for applying a test operation signal to the second signal line portion 220. Following is a description of the first to fifth test pad portions 310, 320, 330, 340 and 350 respectively connected to the first to fifth driving lines 221, 222, 223, 224 and 225.

As illustrated in FIG. 3, the first to fifth test pad portions 310, 320, 330, 340 and 350 include first to fifth test pads 311, 321, 331, 341 and 351, first to fifth extension lines 312, 322, 332, 342 and 352 respectively extending from the first to fifth test pads 311, 321, 331, 341 and 351, and first to fifth bridge wires 313, 323, 333, 343 and 353 for respectively connecting the first to fifth extension lines 312, 322, 332, 342 and 352 and the first to fifth driving lines 221, 222, 223, 224 and 225.

The first bridge wire 313 of the first test pad portion 310 is connected to the first driving line 221 to supply the test vertical synchronization start signal T-STV received via the first test pad 311 and the first extension line 312 to the first line 221. The second bridge wire 323 of the second test pad portion 320 is connected to the second driving line 222 to supply the first test clock signal T-CKV received via the second test pad 321 and the second extension line 322 to the second line 222. The third bridge wire 333 of the third test pad portion 330 is connected to the third driving line 223 to supply the second test clock signal T-CKVB received via the third test pad 331 and the third extension line 332 to the third line 223. The fourth bridge wire 343 of the fourth test pad portion 340 is connected to the fourth driving line 224 to supply the test gate turn-off signal T-Voff received via the fourth test pad 341 and the fourth extension line 342 to the fourth line 224. The fifth bridge wire 353 of the fifth test pad portion 350 is connected to the fifth driving line 225 to supply the test gate turn-on signal T-Von received via the fifth test pad 351 and the fifth extension line 352 to the fifth line 225.

In this particular exemplary embodiment, the driving lines 221, 222, 223, 224 and 225 are preferably formed of at least one of a metal from which the gate lines G1 to Gn are formed and a metal from which the data lines D1 to Dm are formed. In addition, the first to fifth extension lines 312, 322, 332, 342 and 352 of the first to fifth test pad portions 310, 320, 330, 340 and 350 is advantageously formed of at least one of the metal of the gate lines G1 to Gn and the metal of the data lines D1 to Dm. It is also preferable that the driving lines 221, 222, 223, 224 and 225 and the first to fifth extension lines 312, 322, 332, 342, and 352 be simultaneously formed of the same metal. However, the driving lines 221, 222, 223, 224 and 225 and the first to fifth extension lines 312, 322, 332, 342, and 352 may also be respectively formed of different metals or may be respectively formed through different processes and at different times. The gate lines G1 to Gn and the data lines D1 to Dm may be formed of at least one of Al, Nd, Ag, Cr, Ti, Ta, Mo and respective alloys thereof. The gate and data lines may also be formed to have either a single- or a multi-layered structure. That is, the gate and data lines may be formed to have a double- or triple-layered structure, including a metal layer, such as Cr, Ti, Ta, and Mo, which have excellent physico-chemical characteristic, and an Al- or Ag-based metal layer having a small resistivity.

When the above lines are formed of the above types of metals, They may have a reduced line resistance. However, when corrosion occurs in a portion of the line, it spreads over the entire line, and when the entire line corrodes, its electrical characteristic deteriorate significantly. In particular, conventional test pad portions are formed in the shape of an extension line protruding from a portion of the driving line. The pads in the test pad portion are disposed in the open region of the peripheral region and are thus exposed to air. As a result, the test pad portion can easily corrode due to the moisture in the air. The corrosion of the test pad portion spreads over the driving lines connected thereto, thereby resulting in corrosion of the entire driving lines.

In the present embodiment, the first to fifth extension lines 321, 322, 332, 342 and 352 of the first to fifth test pad portions 310, 320, 330, 340 and 350 and the first to fifth driving lines 221, 222, 223, 224 and 225 are not formed as single lines, but are connected to each other via the first to fifth bridge wires 313, 323, 333, 343 and 353 formed of a conductive layer that does not spread corrosion. Accordingly, the corrosion of the first to fifth test pads 311, 321, 331, 341 and 351 of the first to fifth test pad portions 310, 320, 330, 340 and 350 will spread to the first to fifth extension lines 312, 322, 332, 342 and 352. However, the further spread of the corrosion is blocked by the first to fifth bridge wires 313, 323, 333, 343 and 353 disposed at the ends of the first to fifth extension lines 312, 322, 332, 342 and 352, and therefore, does not spread to the driving lines 221, 222, 223, 224 and 225. Here, the driving pads 241, 242, 243, 244, and 245 provided at the ends of the driving lines 221, 222, 223, 224 and 225 are also provided in the open region of the peripheral region, but are respectively disposed in close contact with a corresponding connection pad (not illustrated) of the control unit 130. Accordingly, the signal line pad portion 240 is not exposed to air, and thus, does not easily corrode.

The first to fifth bridge wires 313, 323, 333, 343 and 353 having the aforementioned characteristics are preferably formed of the same material and in the same layer as the pixel electrodes. Thus, the first to fifth bridge wires 313, 323, 333, 343 and 353 are advantageously formed of indium tin oxide (ITO) or indium zinc oxide (IZO). A conductive layer formed of indium tin oxide has a resistance to corrosion that suppresses the spread of corrosion to the signal lines. However, it will be apparent that the first to fifth bridge wires 313, 323, 333, 343 and 353 are not limited to ITO and IZO but may be formed of a variety of other conductive materials that have a similar resistance to corrosion or to the spread of corrosion.

Each of the first to fifth bridge wires 313, 323, 333, 343 and 353 includes a first bridge contact pad 301 respectively connected to the driving lines 221, 222, 223, 224 or 225, a second bridge contact pad 302 respectively connected to the extension lines 312, 322, 332, 342 or 352, and a connection wire 303 for respectively connecting the first and second bridge contact pads 301 and 302 to each other, as illustrated in FIG. 4. Here, the first and second bridge contact pads 301 and 302 partially expose the driving lines 221, 222, 223, 224 and 225 and the extension lines 312, 322, 332, 342 and 352 that are protected by an insulating layer 11.

Thus, when the first and second bridge contact pads 301 and 302 are exposed to air, the driving lines 221, 222, 223, 224 and 225 and the extension lines 312, 322, 332, 342 and 352, which are under the first and second bridge contact pads 301 and 302, may easily corrode. Accordingly, the first and second bridge contact pads 301 and 302 are disposed in the sealing region S of the peripheral region P. Thus, in the exemplary embodiment illustrated, the first and second bridge contact pads 301 and 302 are preferably disposed below the sealing member 400 in the sealing region S, as illustrated in FIG. 4. Accordingly, the sealing member 400 covers the first and second bridge contact pads 301 and 302 to prevent penetration of, for example, external moisture that is a cause of the corrosion of the metal layer.

An exemplary method for manufacturing the bridge contact pad portions 310, 320, 330, 340 and 350 having the bridge wires 313, 323, 333, 343 and 353 as described above is as follows.

A metal layer is formed on the lower substrate 10 and etched to form the gate lines G1 to Gn and the driving lines 221, 222, 223, 224 and 225, and the extension lines 312, 322, 332, 342 and 352 of the bridge contact pad portions 310, 320, 330, 340 and 350 which are spaced apart from the driving lines 221, 222, 223, 224 and 225 are also formed. In this example, gate and storage electrodes (not illustrated) of the thin film transistors T connected to the gate lines G1 to Gn are formed together. Then, a gate insulating layer (not illustrated) is formed over the entire structure, and an active region (not illustrated) is formed on the gate electrodes. The data lines D1 to Dm are formed perpendicular to the gate lines G1 to Gn, and source and drain electrodes (not illustrated) are formed on the gate electrodes, thereby completing the thin film transistors T. A passivation layer (not illustrated) is then formed over the entire structure, and a plurality of contact holes (not illustrated) are formed by partially removing the passivation layer.

The holes that are formed in the passivation layer include contact holes for the driving pads exposing the ends of the driving lines 221, 222, 223, 224 and 225, contact holes for the test pads exposing the one ends of the extension lines 312, 322, 332, 342 and 352, contact holes for the first bridge contact pads exposing the other ends of the extension lines 312, 322, 332, 342 and 352, and contact holes for the second bridge contact pads exposing portions of the driving lines 221, 222, 223, 224 and 225.

A transparent conductive layer is then formed on the passivation layer and patterned to form the pixel electrodes, the driving pads 241, 242, 243, 244 and 245 are formed over the contact holes for the driving pads, and the test pads 311, 321, 331, 341 and 351 are formed over the contact holes for the test pads. The first and second bridge contact pads 301 and 302 are then formed over the contact holes for the first and second bridge contact pads, and the connection wires 303 are respectively formed for connecting the first and second bridge contact pads 301 and 302 to each other, thereby resulting in the bridge wires 313, 323, 333, 343 and 353. The test pad portions 310, 320, 330, 340 and 350, including the test pads 311, 321, 331, 341 and 351, the extension lines 312, 322, 332, 342 and 352 extending from the test pads 311, 321, 331, 341 and 351, and the bridge wires 313, 323, 333, 343 and 353 for connecting the extension lines 312, 322, 332, 342 and 352 and the driving lines 221, 222, 223, 224 and 225 can be formed in the same manner.

It should be understood that the test pad portions 310, 320, 330, 340 and 350 of the above exemplary embodiment are not limited those described above, but variations thereto may be made. For example, as illustrated in FIGS. 5 and 6, the test pad portions 310, 320, 340, 350 can be manufactured in the form of a single conductive layer that does not spread the corrosion. When the test pad portion 310 is manufactured in the form of a single conductive layer, the bridge wires 313, 323, 333, 343 and 353 may be omitted. That is, the test pad portions 310, 320, 330, 340 and 350 include extension lines 312, 322, 332, 342 and 352 extending from test pads 311, 321, 331, 341 and 351, and contact pads 314, 324, 334, 344 and 354 for connecting the extension lines 312, 322, 332, 342 and 352 and driving lines 221, 222, 223, 224 and 225, respectively. In the test pad portions 310, 320, 330, 340 and 350, the test pads 311, 321, 331, 341 and 351, the extension lines 312, 322, 332, 342 and 352, and the contact pads 314, 324, 334, 344 and 354 may be formed of ITO or IZO, which are the same as used for making pixel electrodes, and patterned together along with the pixel electrodes. Additionally, the driving lines 221, 222, 223, 224 and 225 may have the same line width, as illustrated in FIG. 5.

Although five test pad portions connected to the signal line portion 220 and five extension lines have been described, the present embodiment is not limited thereto, but rather, the number of the lines and the test pad portions may be different, i.e., the lines and the test pad portions may differ from each other in number. Further, the control unit may be divided into a data driving unit and a signal control unit. The control unit may be mounted on a separate printed circuit board and electrically connected to the signal lines via a flexible printed circuit board.

A second exemplary embodiment of a display device in accordance with the present invention and incorporating the above features is described below with reference to FIG. 7. In the following description, further detailed description of those portions of the second embodiment that are the same as those of the first embodiment is omitted for brevity. Additionally, it should be understood that many of the features of the second embodiment below may be applied to the first embodiment above.

Figure 7:
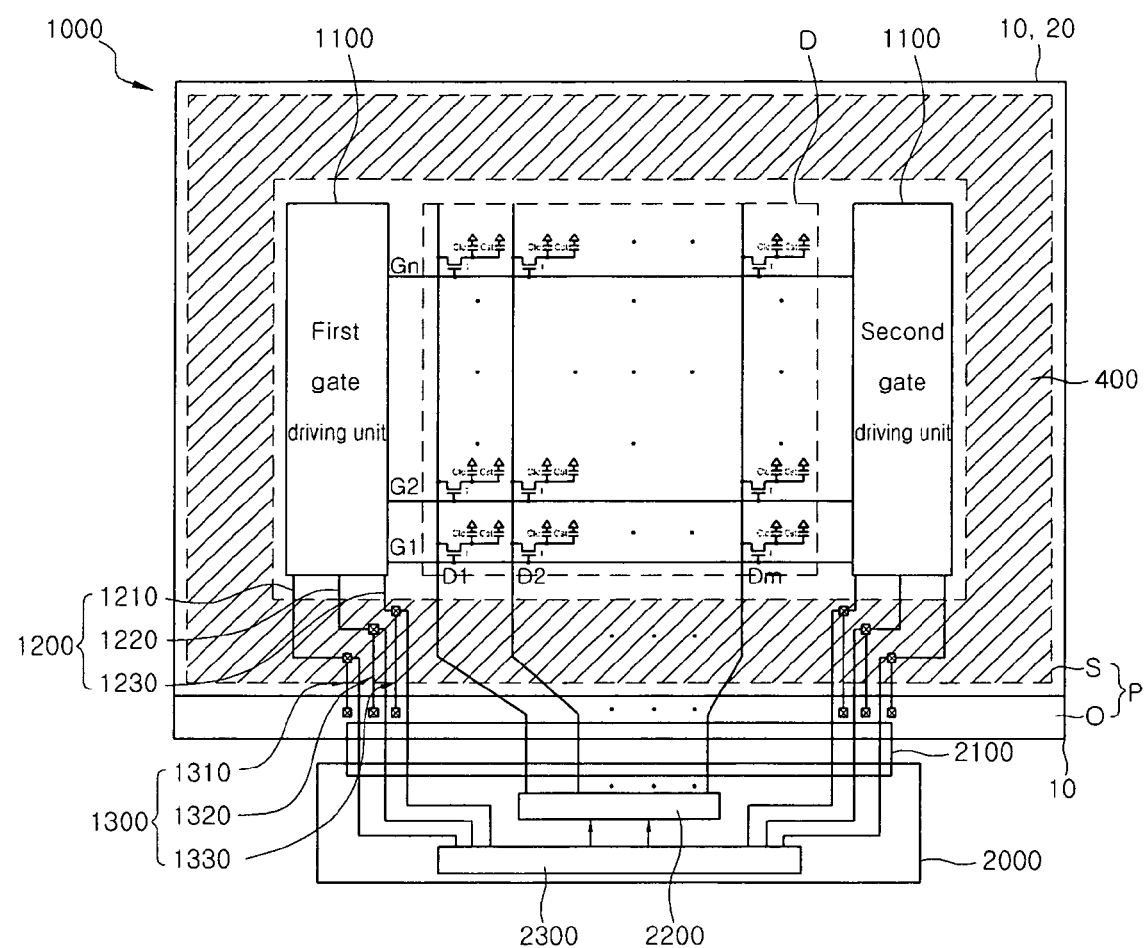

FIG. 7 is a conceptual plan view of the second exemplary embodiment of a display device in accordance with the present invention. Referring to FIG. 7, the second exemplary display device includes an LCD panel 1000 including respective display and peripheral regions D and P, and a printed circuit board 2000 connected to the LCD panel 1000 via a flexible printed circuit board 2100, as described above.

The LCD panel 1000 includes lower and upper substrates 10 and 20, each of which includes the display region D and the peripheral region P. The display region D of the lower substrate 10 includes gate lines G1 to Gn, data lines D1 to Dm, thin film transistors T, and pixel electrodes. The peripheral region P of the lower substrate 10 includes first and second gate driving units 1100, driving lines 1200 connected to the first and second gate driving units 1100, and a left side test pad portion 1300 connected to the driving lines 1200. Portions of the data lines D1 to Dm extend to the peripheral region P of the upper substrate 20. The test pad portion 1300 includes test pads provided in the open region O of the peripheral region P, extension lines extending from the test pads to the sealing region S of the peripheral region P, and bridge wires provided in the sealing region S for connecting the extension lines and the driving lines 1200.

The bridge wires may be formed of ITO or IZO. The bridge wires block corrosion of the test pads in the open region O from spreading to the extension lines and the driving lines 1200. In the second exemplary embodiment, the test pad portion 1300 itself may also be formed of ITO or IZO. That is, a single-layer test pad portion 1300 includes the test pads provided in the open region O of the peripheral region P, the extension lines extending from the test pads to the sealing region S of the peripheral region P, and the contact pads in the sealing region S for connecting the extension lines and the driving lines 1200. Accordingly, by forming the test pad portion 1300 of a single layer comprising ITO or IZO, even if the test pads or extension lines in the open region O corrode, the corrosion does not spread over the sealing region S, and accordingly, corrosion of the driving lines 1200 is prevented.

The printed circuit board 2000 includes a data driving unit 2200 connected to the data lines D1 to Dm in the peripheral region P of the LCD panel 1000 via the flexible printed circuit board 2100, and a signal control unit 2300 for controlling the operation of the data driving unit 2200. In this embodiment, the signal control unit 2300 is connected to the driving lines 1200 in the peripheral region P of the LCD panel 1000 via the flexible printed circuit board 2100. Although not shown, the display device may further include a driving voltage generating unit for generating a plurality of driving voltages. A data signal from the data driving unit 2200 is provided to the plurality of data lines D1 to Dm of the LCD panel 1000 via the flexible printed circuit board 2100. A driving signal from the signal control unit 2300 is provided to the driving lines 1200 of the LCD panel 1000 via the flexible printed circuit board 2100 to drive the first and second gate driving units 1100. The first and second gate driving units 1100 receive driving signals, including a clock signal, an inverted clock signal, and a vertical synchronization start signal, from the signal control unit 2300, and sequentially supply the clock signal and the inverted clock signal, as gate turn-on signals, to the plurality of gate lines G1 to Gn. The first and second gate driving units 1100 may also receive test driving signals, including a test clock signal, an inverted test clock signal, and a test vertical synchronization start signal, from the test pad portion 1300, and sequentially supply the test clock signal and the inverted test clock signal, as the gate turn-on signals, to the plurality of gate lines.

In accordance with the exemplary embodiments of the present invention described above, the operation of elements in the display region of the display device can be tested by connecting the test pad portion capable of supplying a test signal to the signal lines that normally supply electrical signals to those elements.

According to the present invention, corrosion occurring in the test pads can be pre-vented from spreading to the signal lines by connecting the signal lines and the test pads via bridge wires made of a conductive material having corrosion resistance, thereby protecting the signal lines from corrosion.

In addition, exposure to air of the bridge wire region can be prevented by disposing the bridge wires under the sealing member.

The corrosion generated in the test pad portions can also be prevented from spreading over the associated signal lines by forming the respective test pad portions that are connected to the signal lines using a single conductive layer that does not spread corrosion.

Further, the processes can be simplified by forming the test pad portions contiguous to the associated signal lines of the same ITO or IZO that is used for forming the pixel electrodes.

As those of skill in this art will by now appreciate, many modifications, substitutions and variations can be made in and to the materials, methods and configurations of the LCD panels and corrosion-preventing methods for wiring them of the present invention without departing from the spirit and scope thereof. In light of this, the scope of this invention should not be limited to that of the particular embodiments illustrated and described herein, as they are only by way of examples thereof, but instead, should be fully commensurate with that of the claims appended hereafter and their functional equivalents.

What is claimed is:

1. A display device, comprising:
a display panel, including a display region and a peripheral region;
a plurality of signal lines disposed at least in the peripheral region of the display panel; and,
a plurality of test pad portions disposed in the peripheral region of the display panel and connected to at least some of the plurality of signal lines,
wherein each test pad portion comprises a test pad, an associated extension line extending from the test pad, and an associated bridge wire connecting the associated extension line to the associated signal line; and
wherein the peripheral region of the display panel comprises a sealing region and an open region, the bridge wire is disposed in the sealing region and the test pad is disposed in the open region.

2. The display device of claim 1, wherein the bridge wire is formed of the same material as a pixel electrode in the display region.

3. The display device of claim 1, wherein the bridge wire is formed of at least one of indium tin oxide (ITO) and indium zinc oxide (IZO).

4. The display device of claim 1, wherein the bridge wire comprises first and second bridge contact pads respectively connected to the extension and signal lines and a connection wire connecting the first and second bridge contact pads to each other.

5. The display device of claim 1, further comprising a sealing member in the sealing region disposed around the display region of the display panel, and wherein the bridge wire is disposed under the sealing member.

6. The display device of claim 1, wherein the display panel further comprises:
a lower substrate that includes respective pluralities of gate lines, data lines, thin film transistors, and pixel electrodes;
an upper substrate including a common electrode and a plurality of color filters; and,
a layer of a liquid crystal material sealed between the upper and lower substrates.

7. The display device of claim 6, wherein the signal and extension lines are formed of the same material as and manufactured together with a respective one of the gate lines or the data lines.

8. The display device of claim 6, where in the peripheral region of the display panel comprises a sealing region and an open region, and further comprising:
at least one gate driving unit disposed on the lower substrate in the sealing region and connected to the plurality of gate lines; and,
a control unit disposed on the lower substrate in the open region and connected to the data lines and the gate driving unit via the plurality of the signal lines.

9. The display device of claim 6, further comprising:
at least one gate driving unit disposed on the lower substrate in the peripheral region and connected to the plurality of gate lines;
a printed circuit board connected to the display panel via a flexible printed circuit board;
a data driving unit mounted on the printed circuit board and electrically connected to the data lines via the signal lines; and,
a signal control unit mounted on the printed circuit board and connected to the data driving unit and electrically connected to the gate driving unit via the signal lines.

10. The display device of claim 1, wherein the associated bridge wire is formed of a corrosion resistant material.

11. A display device, comprising:
a display panel including a display region and a peripheral region;
a plurality of signal lines disposed in the peripheral region of the display panel; and,
a plurality of test pad portions disposed in the peripheral region of the display panel and connected to at least some of the plurality of signal lines,
wherein each of the test pad portions comprises a test pad, an extension line extending from the test pad, and a contact pad connecting the extension line to an associated one of the signal lines; and
wherein the peripheral region of the display panel comprises a sealing region and an open region, the contact pad is disposed in the sealing region, and the test pad is disposed in the open region.

12. The display device of claim 11, wherein the test pad portions are formed of the same material as a pixel electrode in the display region.

13. The display device of claim 11, wherein the test pad portions are formed of at least one of ITO and IZO.

14. The display device of claim 11, further comprising a sealing member in the sealing region disposed around the display region of the display panel, wherein the contact pad is disposed under the sealing member.

15. The display device of claim 11, wherein the test pad portions are formed of a corrosion resistant material.

* * * * *